United States Patent [19]

Lydell, deceased et al.

[11] 4,446,617

[45] May 8, 1984

[54] SPLICING HEAD FOR ADDING CONDUCTORS TO AN ELECTRICAL CONNECTOR

[76] Inventors: Donald J. Lydell, deceased, late of Park Rapids, Minn.; by Hilda Lydell, executor, Rte. 4, Box 414, Park Rapids, Minn. 56470

[21] Appl. No.: 348,321

[22] Filed: Feb. 16, 1982

[51] Int. Cl.[3] ........................ H01R 43/04; B23P 00/00

[52] U.S. Cl. .......................................... 29/861; 29/749

[58] Field of Search ................. 29/868, 872, 861, 857, 29/749, 750, 753, 566.3

[56] References Cited

U.S. PATENT DOCUMENTS

| | | | |
|---|---|---|---|
| 3,713,214 | 1/1973 | Enright et al. | 29/749 |
| 3,800,390 | 4/1974 | Johnston | 29/749 |
| 3,803,695 | 4/1974 | Tucci | 29/749 |
| 3,866,296 | 2/1975 | Tucci | 29/749 |
| 3,872,567 | 3/1975 | Cea et al. | 29/721 |
| 3,965,558 | 6/1976 | McKee | 29/749 |
| 3,972,101 | 8/1976 | Casey et al. | 29/749 |
| 4,080,717 | 3/1978 | Bunnell | 29/750 X |

*Primary Examiner*—Howard N. Goldberg
*Assistant Examiner*—Carl J. Arbes
*Attorney, Agent, or Firm*—Kinney & Lange

[57] ABSTRACT

A splicing head for positioning multiple wire pairs of a cable for connection to an electrical connector is provided with a removably mounted comb to facilitate the addition of a second cable to a connector with a connected first cable. The splicing head has a bed for receiving a modular electrical connector with its sattached cable. The comb is then mounted by vertical supports on a backside of the splicing head. The comb has multiple wire guides. A second cable is placed adjacent the comb and its wire pairs are separated and placed in the wire guides. The ends of the wires of the second cable are then attached to proper contacts on the modular connector mounted on the bed which already carry the corresponding wire pairs of the first cable. The comb is then removed to allow removal of a connected unit consisting of the modular connector, the pre-connected first cable, and the newly connected second cable.

10 Claims, 5 Drawing Figures

SPLICING HEAD FOR ADDING CONDUCTORS TO AN ELECTRICAL CONNECTOR

BACKGROUND OF THE INVENTION

1. Field of the Invention

This invention relates to an apparatus for positioning wire pairs of a second communication cable for electrical connection of the wires to a modular connector having a first connected cable.

2. Description of the Prior Art

Communication cables commonly carry multiple pairs of wires. Such cables with multiple wire pairs require sorting of the pairs before attachment to electrical connectors. For example, telephone cables normally include 25, 50 or 100 pairs of wires, which are color-coded. Before attaching the pairs to an appropriate modular connector, a jig is used to separate the wire pairs and also to split the wires of each pair. It is well known in the prior art to place a modular connector on a bed with an attached comb. The wire pairs are separated and placed in individual wire guides in the comb. The pairs are thereby held in place for attachment of electrical connector. Now that so much telephone cable is in place, addition of cables is more common than laying of new cable. This means a second cable of wire pairs is attached to a side of a modular connector which already carries a first cable.

Since these splices are made in cables in place in the field, large shop devices are not acceptable. In order to be usable, the splicing head must be easily portable and usable by a lone worker.

A search on the present invention located the following United States patents:

| Inventor | U.S. Pat. No. | Issue Date |
|---|---|---|
| Enright et al. | 3,713,214 | 1/30/73 |
| Johnston | 3,800,390 | 4/2/74 |
| Tucci | 3,866,296 | 2/18/75 |
| Cea et al. | 3,872,567 | 3/25/75 |
| McKee | 3,965,558 | 6/29/76 |

U.S. Pat. No. 3,713,214 to Enright et al discloses an apparatus for splicing together wires from two communication cables. A comb is used to separate the wires before splicing. A connector is used to splice the pairs of the two cables. The disclosure does not discuss adding an additional cable to one side of the splice.

U.S. Pat. No. 3,965,558 to McKee shows a large shop apparatus for connecting wires of cables to a particular type of solderless connector. This disclosure does not discuss connecting an additional cable to one side of the connector.

U.S. Pat. No. 3,872,567 to Cea et al discloses an apparatus for separating color-coded wires into pairs and sets of pairs using wire jigs which can then be moved to a splicing head.

Application No. 3,800,390 to Johnston discloses apparatus for separating wire pairs of the cable using jigs which can be moved to a connecting device for connecting the conductors to the terminals. Only one cable is connected to each side of each connector.

U.S. Pat. No. 3,866,296 to Tucci discloses a connector and a jig plate for mounting the connector. The connector is designed to connect the ends of wire pairs of a second cable to an intermediate position on a first cable of wire pairs.

None of the prior art devices is designed for adding a second cable to the same connector as a first cable on a module connector. What is needed is a device for neatly separating wires of the second cable, without removing the first cable from the modular connector.

DETAILED DESCRIPTION OF THE PREFERRED EMBODIMENT

Figure 1:
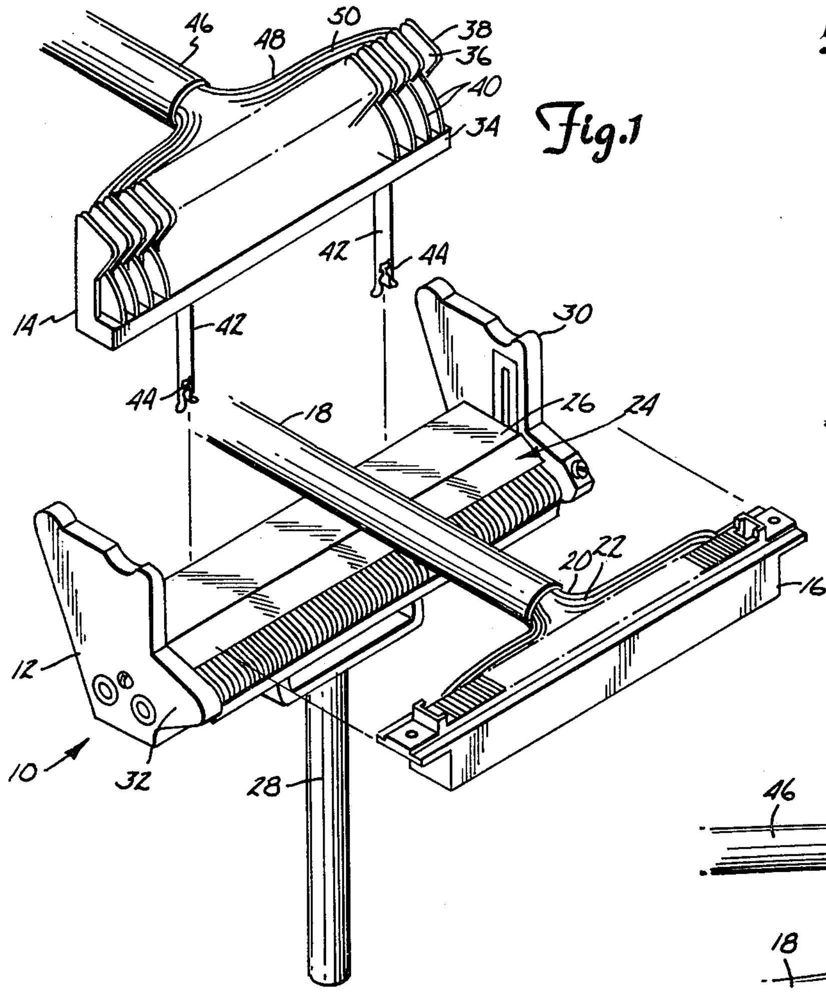
FIG. 1 is a perspective view of a splicing head constructed according to the present invention with a first cable connected to a modular connector, a comb in position for mounting, and a second cable positioned for attachment.

A splicing head 10, as shown in FIG. 1, includes a body 12 and a comb 14. An electrical connector 16 is shown in position to be mounted on body 12 of splicing head 10. In the example shown, electrical connector 16 is a modular communications connector for telephone cable. A first cable 18, shown connected to connector 16, contains multiple communication wires 20 which are arranged in pairs 22. These pairs 22 are commonly color-coded for alignment with contacts on connector 16. In FIG. 1, all the pairs 22 have previously been connected to connector 16.

Body 12 has a bed 24 which receives and holds electrical connector 16 during splicing. Bed 24 is formed by a base 26, which is supported on a post 28, and two side walls 30 and 32. The first step in using splicing head 10 is to place first cable 18 across bed 24, as shown in FIG. 1. First cable 18 is then drawn back towards the rear of body 12 until electrical connector 16 rests in and is held by bed 24.

Comb 14 has a bottom tooth-supporting plate 34. Plate 34 is aligned generally in a plane parallel to the plane of bed 24 when splicing head 10 is in operation. Comb 14 is provided with a plurality of wire guide slots 36, which are formed by a plurality of spaced upright teeth 38. Teeth 38 are mounted vertically on bottom plate 34 and are generally perpendicular to it. The wire guide slots 36 are aligned generally parallel to cable 18 as it lies in bed 24. A plurality of upright pair splitter teeth 40 are mounted on and generally perpendicular to bottom plate 34. Each pair splitter tooth 40 is generally centered on its corresponding wire guide slot 36.

As shown in FIG. 1, a second cable 46 has a plurality of wires 48 arranged in wire pairs 50, which are to be attached to electrical connector 16. The wire pairs 50 are passed through slots 36 of comb 14 and the wires 46 of each pair are split by the associated wire splitter tooth 40.

A mounting means for mounting comb 14 on body 12 includes, in this example, a pair of vertical supports 42 which depend below and generally perpendicular to bottom plate 34. Each vertical support 42 has a spring clip 44 used in its attachment to body 12.

Figure 4:
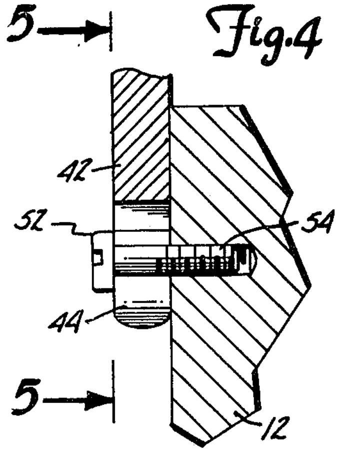
FIG. 4 is a fragmentary cross-sectional view taken along line 4—4 of FIG. 2.
Figure 2:
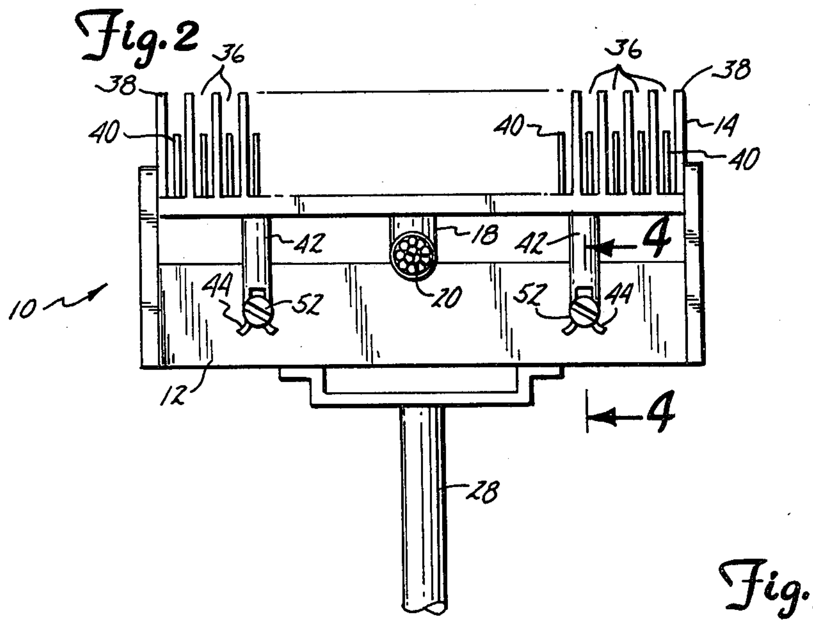
FIG. 2 is a rear view of the splicing head of FIG. 1 with the comb mounted.
Figure 5:
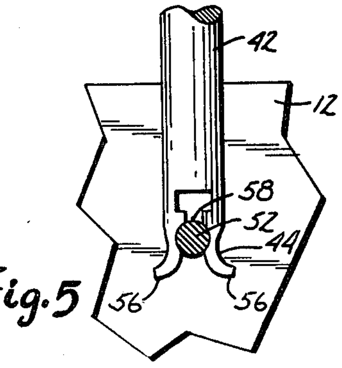
FIG. 5 is a fragmentary cross-sectional view taken along line 5—5 of FIG. 4.

The details of the mounting of comb 14 on body 12 can be seen in the rear view of splicing head 10 in FIG. 2 and in FIGS. 4 and 5. Note that cable 18, shown partially in cross section, is resting on base 26 and extends rearward from splicing head 10. Mounting posts or screws 52 are fixed on the back of body 12. When comb 14 is lowered into its mounted position, clips 44 of vertical supports 42 engage the mounting posts or screws 52.

As shown, screws 52 threadably engage openings 54 in body 12. The vertical supports 42 are moved downward until clips 44 engage the respective screw 52. This engagement is shown in detail in the fragmentary view of FIG. 5, where screw 52 is shown in cross section. Clip 44 has two curved resilient legs 56. Legs 56 form a receptacle 58 for receiving the respective screw 52. As vertical supports 42 are lowered, legs 56 of each clip 44 contacts its respective screw 52 and spread apart. One leg 56 of each clip passes on either side of the associated screw 52. When screws 52 are in place in receptacles 58 and extend outwardly as shown, resilient legs 56 spring back and securely hold comb 14 in place during splicing, but allow easy removal.

Figure 3:
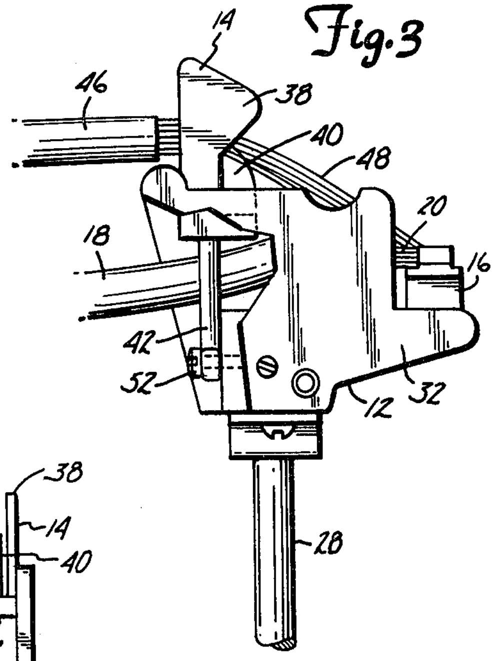
FIG. 3 is a side elevational view of the splicing head of FIG. 1.

Use of splicing head 10 is best shown by FIGS. 1 and 3. First cable 18 is placed across bed 24 as shown in FIG. 1. Cable 18 is then drawn rearward until connector 16 is held in bed 24. Comb 14 is then mounted onto body 12 spaced above first cable 18 as discussed above. First cable 18 remains connected to connector 16 and is held down by bottom plate 34 of comb 14. Second cable 46 is then partially stripped to expose the end portions of wires 48. Second cable 46 is drawn up close to comb 14. The wires 48 are arranged in separate pairs 50. The teeth 38 forming wire guide slots 36 may be color-coded to correspond to the colors of the pairs 50. One pair 50 is inserted in each wire guide slot 36 of comb 14. Each of these wire pairs 50 is then separated into individual wires and held separated by the respective pair splitter teeth 40. The wires 48 are all now properly positioned to connect to the corresponding electrical contacts on electrical connector 16, in the same manner as wires 20 of first cable 18 are connected. Any common method of attaching wires to connector 16 may be used.

Once both first cable 18 and second cable 46 are properly connected to the connector 16, comb 14 is simply lifted off of screws 52 and tilted back to disengage wire pairs 50. It can be removed sideways through the space between the cables. The completed assembly of electrical connector 16, cable 18, and cable 46 may be lifted from bed 24 for installation.

When using a splicing head constructed according to the present invention, the first cable 18 that is connected to the electrical connector remains connected and the wires of cable 18 do not have to be separated or repositioned in wire guide slots. Once comb 14 is mounted, first cable 18 is out of the way and no mixing or confusion of wires occurs.

This greatly simplifies the field installation of additional cables. The former problems involved in having to separate and position all of the wire pairs of the first cable, and then connecting the second cable simultaneously are avoided. When the connector 16 is properly positioned, the wire pairs of the new cable are the only ones that have to be properly located through the comb. The connectors 16 are standardized as to the wire color sequence of connection to the terminals across the connector. Thus by properly placing the wires from cable 46 in the proper color-coded wire guide slot and then connecting the wires to the corresponding terminals of the connector, the wire color coding will correspond the color coding of the wires of the previous cable.

While supports 42 are shown as ports to support comb 14 spaced above the bed 24 to accommodate an existing cable, other types of supports or mounting means also may be used. For example, the comb 14 could be clipped to side walls 30 and 32 to space the comb properly above the bed and overlying portions of the rear of the bed.

Although the present invention has been described with reference to preferred embodiments, workers skilled in the art will recognize that changes may be made in form and detail without departing from the spirit and scope of the invention.

What is claimed is:

1. A method of connecting a second cable containing a plurality of pairs of wires to a modular connector which has a connected first cable, the method comprising the following steps:

laying the modular connector with the connected first cable on a bed;

mounting a comb having a plurality of wire guides, each guide including a wire pair splitter onto the bed, over the first cable in position to permit access to the connector, the wire guides extending in the direction of extension of the first cable;

aligning the second cable generally parallel to and above the first cable;

separating the wire pairs in the second cable;

laying each wire pair of the second cable in its separate wire guide on the comb;

separating the wires of each pair with the pair splitter for the respective guide; and connecting the wires of the second cable to the modular connector without disconnecting the wires of the first cable and without removing the comb from the bed.

2. In a portable splicing head for attaching pairs of wires from a cable to an electrical connector, the head having a body with a bed for holding the connector and a comb including a plurality of wire guides for separating pairs of wires, each wire guide having a pair splitter for separating the wires of the pair, the improvement of a mounting device for the comb to aid in adding a second cable to contacts of a connector to which is connected a first cable, the mounting device comprising:

means coupled to the comb and body for removably mounting the comb on the body in position spaced from the bed and offset from the position on the bed where a connector is to be held sufficient to permit access to a connector on the bed for providing a passageway between the comb and the body for a first cable connected to a connector on the bed, the mounting means comprising a plurality of elongated supports extending between one side of the comb and the body.

3. The apparatus of claim 2 wherein a means for mounting a connector is adjacent the front of the body and the elongated supports are mounted on the comb, the mounting means further including an elongated mounting post for each elongated support extending from a rear side of the body, for attachment of the respective elongated support.

4. The apparatus of claim 3 wherein each elongated support further includes a spring clip having a pair of resilient legs which form a receptacle for one mounting post, the resilient legs being constructed to pass on opposite sides of the respective mounting post as the elongated supports are moved downward and to spring back when the mounting post enters its respective receptacle.

5. The apparatus of claim 2 wherein the bed forms a first surface and the comb forms a second surface spaced from and parallel to the first surface.

6. A portable splicing head for adding a second cable having multiple wires to contacts of a modular connector to which are attached wires of a first cable comprising:

a body including a bed defining a support for holding a modular connector with its connected first cable;

a comb having a plurality of wire guides for separating wires of the second cable and of size to overlie a portion of said bed, said wire guides extending generally parallel to the direction of extension of a first cable of a modular connector on the bed; and mounting means coupled to the body and comb for removably mounting the comb on the body in position over a first cable connected to a modular connector held on the bed, said comb being offset from such modular connector in direction of extension of such first cable to provide access to such modular connector while guiding the wires of the second cable.

7. The apparatus of claim 6, wherein the mounting means includes a plurality of elongated support posts extending from a a side of the comb facing the body.

8. The apparatus of claim 7 wherein the mounting means further includes a pair of elongate mounting posts extending from a rear end of the body, for attachment of the elongated support posts.

9. The apparatus of claim 8 wherein each elongated support post further includes a spring clip having a pair of resilient legs which form a receptacle for one mounting post, the resilient legs being constructed to pass on opposite sides of the respective mounting post as the elongated support posts are moved downward and to spring back when the mounting post is placed in its respective receptacle.

10. The apparatus of claim 6 wherein the bed forms a first surface and the comb forms a second surface spaced from and parallel to the first surface.

* * * * *

UNITED STATES PATENT AND TRADEMARK OFFICE

CERTIFICATE OF CORRECTION

PATENT NO. : 4,446,617

DATED : May 8, 1984

INVENTOR(S) : Donald J. Lydell

It is certified that error appears in the above-identified patent and that said Letters Patent is hereby corrected as shown below:

Column 4, line 57, (Claim 3, line 1), remove "a" and insert --second--. Column 4, line 58, (Claim 3, line 2), before "adjacent" insert --positioned--; remove "the" (first occurrence); insert --a-- before "front"; insert --side-- before "the". Column 4, line 60, (Claim 3, line 4), insert --first mentioned-- before "mounting". Column 6, line 6, (Claim 7, line 3), remove "a" (first occurrence).

Signed and Sealed this

*Fourth* Day of *December 1984*

[SEAL]

*Attest:*

GERALD J. MOSSINGHOFF

*Attesting Officer* *Commissioner of Patents and Trademarks*